United States Patent [19]

Sato

[11] 3,903,377

[45] Sept. 2, 1975

[54] ECHO CANCELLER UTILIZING CORRELATION

[75] Inventor: Akira Sato, Tokyo, Japan

[73] Assignee: Kokusai Denshin Denwa Kabushiki Kaisha, Japan

[22] Filed: Jan. 16, 1974

[21] Appl. No.: 433,855

[30] Foreign Application Priority Data

Jan. 19, 1973 Japan .................................. 48-7859

[52] U.S. Cl. .............................................. 179/170.2
[51] Int. Cl.$^{2}$.............................................. H04B 3/20
[58] Field of Search............ 179/170.2, 170.4, 170.6

[56] References Cited

UNITED STATES PATENTS

| | | | |
|---|---|---|---|
| 3,588,385 | 6/1971 | Moye | 179/170.2 |
| 3,647,992 | 3/1972 | Thomas | 179/170.2 |
| 3,732,410 | 5/1973 | MacKechnie | 179/170.2 |

*Primary Examiner*—Kathleen H. Claffy
*Assistant Examiner*—Randall P. Myers
*Attorney, Agent, or Firm*—Robert E. Burns; Emmanuel J. Lobato; Bruce L. Adams

[57] ABSTRACT

An echo canceller for cancelling echoes reflected from the receiving path of a long-distance telephone circuit to the sending path through a four-wire to two-wire coupling circuit, in which cross-correlation between the instantaneous level of a receiving signal in the receiving path and the instantaneous level of a sending path in the sending path is established in regular intervals in addition to the autocorrelation of the instantaneous level of the receiving signal. The impulse response of an echo return path from the receiving path to the sending path through the four-wire to two-wire coupling circuit is calculated by the use of the cross-correlation and the autocorrelation and then integrated to provide a convolution integral output. The convolution integral output is subtracted from the sending signal to cancel the echoes.

5 Claims, 2 Drawing Figures

ECHO CANCELLER UTILIZING CORRELATION

This invention relates to an echo canceller for preventing echo disturbance in a long-delay telephone circuit, such as a satellite communication circuit or the like.

Hitherto, there has been proposed this kind of device as disclosed in a publication "An adaptive echo canceller" by M. M. Sondhi, Bell System Technical Journal April 1967, in which (1) a search signal pulse is applied to an echo return path to obtain an impulse response of the echo return path immediately before the start of talking so that a pseudo-echo is reproduced by using the impulse response and a receiving signal current, and moreover the pseudo-echo is inverted in phase and applied to a transmission line, thereby to cancel an echo; or in which (2) after a delay and a loss are caused in the receiving signal current by a delay circuit and a variable attenuation circuit, the receiving signal current is inverted in phase and applied to the transmission line to cancel the echo and moreover the variable attenuation loss is altered so that an output of correlation between the receiving signal current and a residual echo still remaining after the above signal combining may be reduced to zero, thereby minimizing the echo. Accordingly, in the former, since it is necessary to receive an information signal indicative of the taking-up a handset by the calling party and to generate and transmit the search signal pulse, the device and the control thereof are inevitably complicated. Further, the former is defective in that since the impulse response of the echo return path once measured varies with frequency fluctuation, impedance fluctuation or the like of the echo return path, sufficient echo cancell 'ion cannot be achieved with a plurality of pseudo-echoes which are produced at constant intervals. The latter is free from such complexity of the device and the control thereof as the former but defective in that since a feedback loop for echo cancellation is provided, the time for convergence of the echo cancellation becomes long and a part of the echo is still left uncancelled.

An object of this invention is to provide an echo canceller which neither requires generation and transmission of the search signal nor has the loop for echo cancellation and which has excellent echo cancellation characteristics.

The device of this invention is constructed under the following principle: (1) the cross-correlation between the receiving signal current and an echo entered into the sending path is obtained; (2) a convolution integral equation is solved by using an output of the cross-correlation and an autocorrelation output of the receiving signal current to obtain an impulse response; (3) a convolution integral of the impulse response and the receiving signal current is achieved to compose a pseudo-echo; and (4) the pseudo-echo is applied to the sending path.

The principle, construction and operations of this invention will be clearly understood from the following detailed description taken in conjunction with the accompanying drawings, in which.

Figure 1:
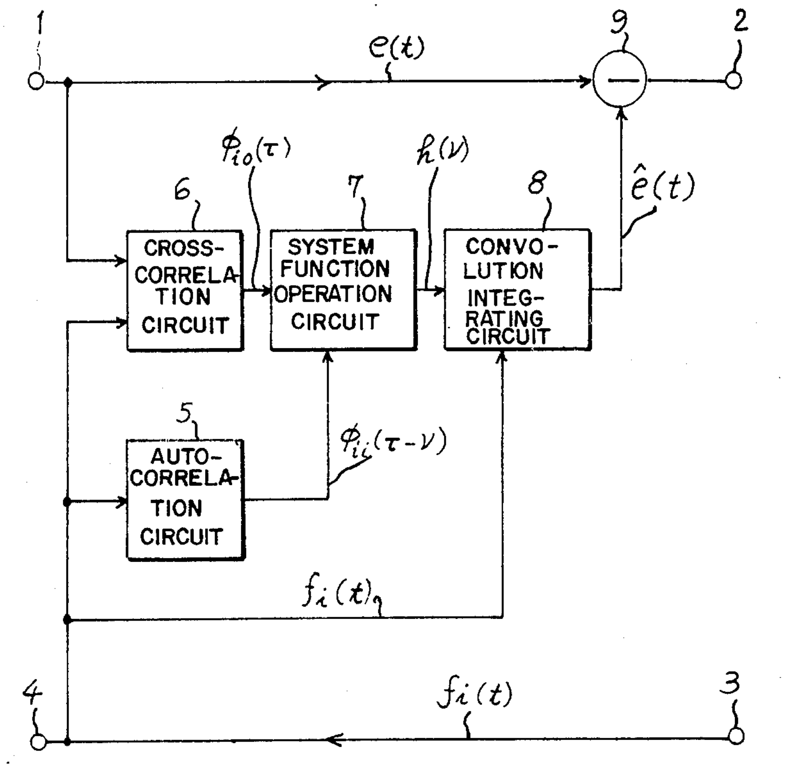
FIG. 1 is a block diagram explanatory of the principle of this invention.

A description will be given first for the principle of this invention. Generally, in the case where a random input $f_i(t)$ is applied to a certain linear system having an impulse response $h(\nu)$ because of a time lag ($\nu$), even if another independent external signal is applied to the system in addition to the input $f_i(t)$, the following equation holds:

$$\phi_{io}(\tau) = \int_{-\infty}^{\infty} h(\nu)\phi_{ii}(\tau-\nu)d\nu \qquad (1)$$

Namely, a value $\phi_{io}(\tau)$ is a cross-correlation function between the input $f_i(t)$ and an output $f_o(t+\tau)$ and is also expressed by the following equation:

$$\phi_{io}(\tau) = \lim_{T\to\infty} \frac{1}{2T} \int_{-T}^{T} f_i(t).f_o(t+\tau)dt \qquad (2)$$

Further, a value $\phi_{ii}(\tau-\nu)$ is an autocorrelation function between the inputs $f_i(t)$ and $f_i(t+\tau-\nu)$ and is expressed as follows:

$$\phi_{ii}(\tau-\nu) = \lim_{T\to\infty} \frac{1}{2T} \int_{-T}^{T} f_i(t).f_i(t+\tau-\nu)dt \qquad (3)$$

Consequently, if it is assumed that an echo transmission path: the receiving input from a four-wire section of a telephone circuit — a two-wire section including a telephone set — the sending output to the four-wire section, that is, the so-called echo return path, is regarded as a linear circuit having an impulse response function and a transfer function, an output $f_o(t)$ is reproduced by a first step of obtaining the cross-correlation function $\phi_{io}(\tau)$ between the sending signal current including an echo and the actual receiving signal current and, at the same time, if obtaining the autocorrelation function $\phi_{ii}(\tau-\nu)$ of the receiving signal current, by a second step of obtaining the impulse response $h(\nu)$ by solving the convolusion integral equation (1), and by a third step of obtaining a convolution integral of the impulse response $h(\nu)$ and the receiving signal current $f_i(t)$, that is, $$f_o(t) = \int_{-\infty}^{\infty} h(\nu).f_i(t-\nu)d\nu \qquad (4)$$

and the value $f_o(t)$ thus obtained is subtracted from the echo included in the sending path, whereby the echo can be cancelled.

FIG. 1 is a block diagram showing an embodiment of this invention based on the above-described principle. A reference numeral 1 indicates a sending signal input terminal, at which a near-end party's voice arrives. A reference numeral 2 designates a sending signal output terminal, from which the near-end party's voice signal is sent out to a transmission line. A reference numeral 3 identifies a receiving signal input terminal, at which a far-end party's voice signal arrives. A reference numeral 4 represents a receiving signal output terminal, from which the far-end party's voice signal is transmitted to the near-end party. A four-wire to two-wire coupling circuit including a hybrid network is omitted from FIG. 1 for simple illustration. A reference numeral 5 denotes an autocorrelation circuit, which effects the operation of the equation (3) to derive therefrom the autocorrelation function $\phi_{ii}(\tau-\nu)$ of the receiving signal current. A reference numeral 6 refers to a cross-correlation circuit, which achieves the operation of the equation (2) to provide $\phi_{io}(\tau)$. A reference numeral 7 shows a system function operation circuit, comprising a conventional computer, for example, which achieves the operation of the equation (1) by substituting values $\phi_{io}(\tau-\nu)$ and $\phi_{io}(\tau)$ thereinto to provide the impulse response $h(\nu)$. A reference numeral 8 identifies a convolusion integrating circuit, which effects the convolusion integral of the impulse response $h(\nu)$ and the receiving signal current $f_i(t)$, that is, the operation of the equation (4), to provide a pseudo-echo $\hat{e}(t)$. A reference numeral 9 denotes a subtracter, in which the pseu- Equation (2):

$$\phi_{io}(m\sigma) \approx \frac{\Delta t}{2n+1} \sum_{l=-n}^{n} f_i(l.\Delta t) f_o(l.\Delta t + m\sigma) \qquad (6)$$

Equation (3):

$$\phi_{ii}(m\sigma - p\sigma) \approx \frac{\Delta t}{2n+1} \sum_{l=-n}^{n} f_i(l.\Delta t) f_i(l.\Delta t + m\sigma - p\sigma) \qquad (7)$$

Equation (4):

$$f_o(l.\Delta t) \approx \Delta t \sum_{p=-r}^{r} h(p\sigma) f_i(l.\Delta t - p\,\sigma) \qquad (8)$$

where $n$ and $r$ are finite integers. The operations of the equations (6) and (7) can be achieved by the use of delay circuits or shift registers, multiplier circuits and accumulators. The equation (5) can be transformed into such a form as the following equation (9) under a relation: $m = r$ :

$$\begin{bmatrix} \phi_{io}(0) \\ \phi_{io}(\sigma) \\ \cdot \\ \cdot \\ \cdot \\ \phi_{io}(i\sigma) \\ \cdot \\ \phi_{io}(m\sigma) \end{bmatrix} = \sigma \begin{bmatrix} \phi_{ii}(r\sigma), \phi_{ii}[(r-1)\sigma] \text{ - } \phi_{ii}(0) \text{ - - } \phi_{ii}[(1-r)\sigma], \phi_{ii}(-r\sigma) \\ \phi_{ii}[(1+r)\sigma], \phi_{ii}(r) \text{ - - } \phi_{ii}(\sigma)\phi_{ii}(0) \text{ - - } \phi_{ii}[(1-r)\sigma] \\ \\ \\ \phi_{ii}[(1+r)\sigma], \phi_{ii}[(i+r-1)\sigma], \phi_{ii}(i\sigma) \ldots\ldots \phi_{ii}[(i-r)\sigma] \\ \phi_{ii}[(m+r)\sigma] \phi_{ii}(m\sigma) \ldots\ldots\ldots \phi_{ii}[(m-r)\sigma] \end{bmatrix} \begin{bmatrix} h(-r\sigma) \\ \\ h(-\sigma) \\ h(0) \\ h(\sigma) \\ \\ h(r\sigma) \end{bmatrix} \qquad (9)$$

do-echo $\hat{e}(t)$ is subtracted from a true echo $e(t)$.

While the equations (1), (2), (3) and (4) are all ex-

If values $h(-r\sigma), \ldots$ and $h(-\sigma)$ are all zero in the equation (9), the equation (9) is rewritten as follows:

$$\begin{bmatrix} \phi_{io}(0) \\ \phi_{io}(\sigma) \\ \cdot \\ \cdot \\ \cdot \\ \phi_{io}(i\sigma) \\ \cdot \\ \phi_{io}(m\sigma) \end{bmatrix} = \sigma \begin{bmatrix} \phi_{ii}(0), \phi_{ii}(-\sigma) \text{ - - - - } \phi_{ii}(-m\sigma) \\ \phi_{ii}(\sigma), \phi_{ii}(0) \text{ - - - - } \phi_{ii}[(1-m)\sigma] \\ \\ \\ \phi_{ii}(i\sigma), \phi_{ii}[(i-1)\sigma] \text{ - - } \phi_{ii}[(i-m)\sigma] \\ \phi_{ii}(m\sigma), \phi_{ii}[(m-1)\sigma] \text{ - - } \phi_{ii}(0) \end{bmatrix} \begin{bmatrix} h(0) \\ h(\sigma) \\ \\ \\ h(i\sigma) \\ h(m\sigma) \end{bmatrix} \qquad (10)$$

pressed in the form of infinite and continuous integral equations, these integral equations must be made finite and discontinuous in practice, so that these integral equations are transformed as will be hereinbelow described.

Accordingly, the values $h(0), \ldots$ and $h(m\sigma)$ can be obtained by solving the determinant (10).

Since an equation: $\phi_{ii}(-\sigma) = \phi_{ii}(\sigma)$ is satisfied, the equation (10) can be transformed into the following equation (11):

$$\begin{bmatrix} \phi_{io}(0) \\ \phi_{io}(\sigma) \\ \cdot \\ \cdot \\ \cdot \\ \phi_{io}(i\sigma) \\ \cdot \\ \phi_{io}(m\sigma) \end{bmatrix} = \sigma \begin{bmatrix} \phi_{ii}(0), \phi_{ii}(-\sigma), \text{ - - - - } \phi_{ii}(m\sigma) \\ \phi_{ii}(\sigma), \phi_{ii}(0) \text{ - - - - } \phi_{ii}[(m-1)\sigma] \\ \\ \\ \phi_{ii}(i\sigma), \phi_{ii}[(i-1)\sigma] \text{ - - - } \phi_{ii}[(m-i)\sigma] \\ \phi_{ii}(m\sigma), \phi_{ii}[(m-1)\sigma] \text{ - - - } \phi_{ii}(0) \end{bmatrix} \begin{bmatrix} h(0) \\ h(\sigma) \\ \\ \\ h(i\sigma) \\ h(m\sigma) \end{bmatrix} \qquad (11)$$

Since the voice current handled here is usually included in a frequency range of 0.3 KHz to 3.4 KHz, it is sufficient to sample it at a timing of 8 KHz to make the voice current discontinuous. In this case, the interval $\Delta t$ of the sampling is equal to a period of 125 microseconds. At first, the receiving signal current $f_i(t)$ and its convolution integral $f_o(t)$ are transformed as follows:

$f_i(t) \Longrightarrow f_i\,(l\cdot\Delta t)$ $f_o(t) \Longrightarrow f_o\,(l\cdot\Delta t),\ l=0, 1, 2, \ldots$ Further, if the following relations are assumed $$\tau = m\,.\,\sigma \qquad \sigma = \Delta t$$

$$\nu = p\,.\,\sigma \qquad m, p = 0, 1, 2, \ldots$$

the equations (1), (2), (3) and (4) are expressed in the following discontinuous and finite forms:

Equation (1):

$$\phi_{io}(m\sigma) \approx \sigma \sum_{p=-r}^{r} h(p\sigma)\phi_{ii}(m\sigma - p\sigma) \qquad (5)$$

Figure 2:
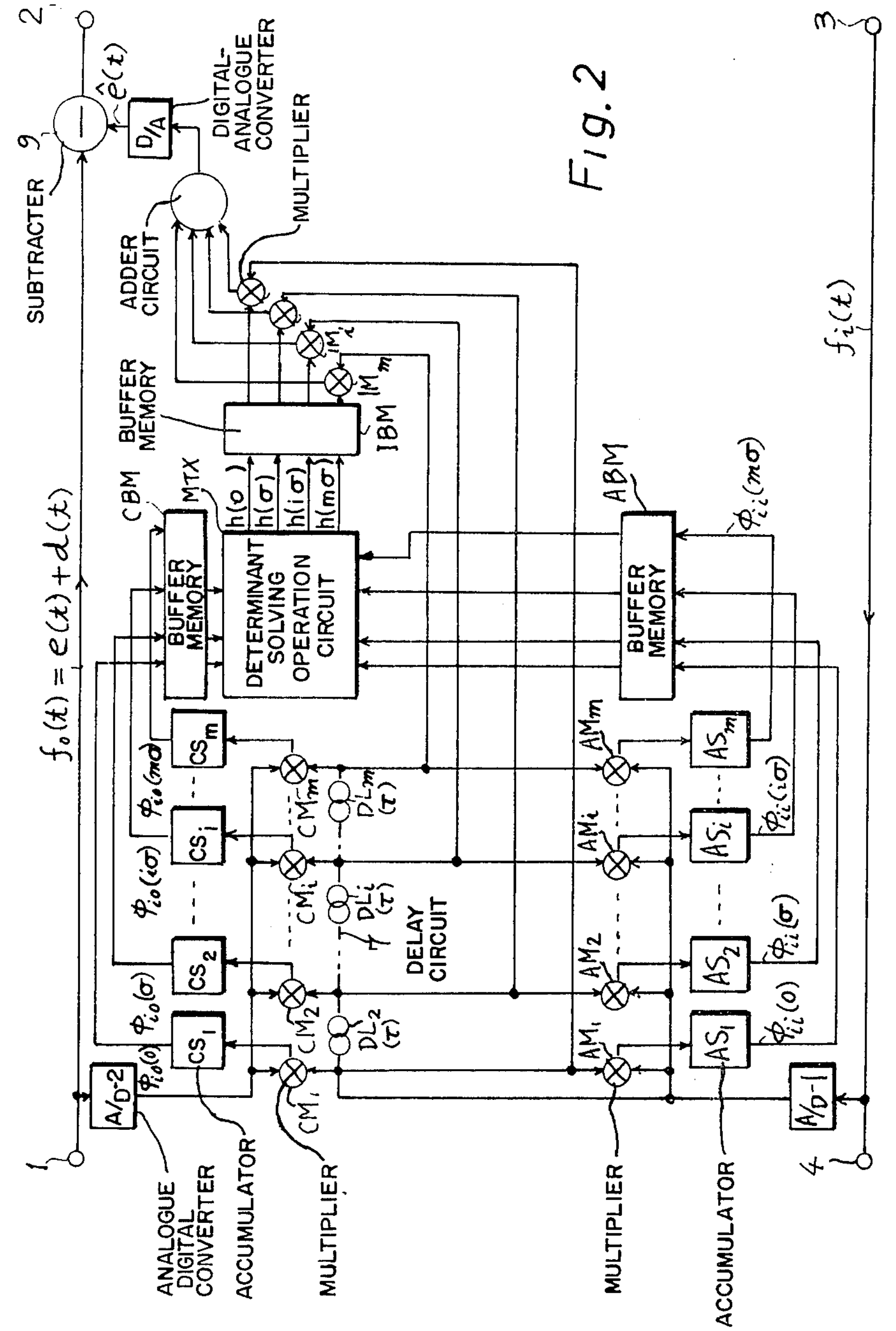
FIG. 2 is a block diagram illustrating an embodiment of this invention.

FIG. 2 illustrates a concrete circuit of this invention. Reference characters A/D-1 and A/D-2 designate analogue-digital signal converters having a sampling frequency of 8 KHz, and a reference character D/A indentifies a digital-analogue converter. A reference numeral 1 designates a sending signal input terminal, 2 indicates a sending signal output terminal, 3 identifies a receiving signal input terminal, 4 denotes a receiving signal output terminal, and 7 represents delay circuits ($DL_2 \ldots DL_i \ldots DL_m$) having successive delay times $\sigma$ or a shift register. Reference characteris $CM_1, CM_2, \ldots CM_i, \ldots$ and $CM_m$ refer to multipliers for obtaining the cross-correlation; $AM_1, AM_2, \ldots AM_i, \ldots$ and $AM_m$ show multipliers for obtaining the autocorrelation; $CS_1, CS_2, \ldots CS_i, \ldots$ and $CS_m$ indicate accumulators for obtaining the cross-correlation; $AS_1, AS_2, \ldots AS_i \ldots$ and $AS_m$ represent accumulators for obtaining the autocorrelation; CBM designates a buffer memory for temporarily storing therein the outputs of the accumulators $CS_1, CS_2, \ldots CS_i \ldots$ and $CS_m$; ABM denotes a buffer memory for temporarily storing therein the outputs of the accumulators $AS_1, AS_2, \ldots AS_i \ldots$ and $AS_m$; and MTX indentifies a determinant solving operation circuit, comprising a conventional computer, for example which achieve the operation for solving the equation (11), that is, the operation of the following equation (12) with the outputs $\phi_{io}(0)$, $\phi_{io}(\sigma)$, . . . $\phi_{io}(i\sigma)$ . . . and $\phi_{io}(m\sigma)$ of the accumulators $CS_1$, $CS_2$, . . . $CS_i$, . . . and $CS_m$ temporarily stored in the buffer memory CBM and the outputs $\phi_{ii}(0)$, $\phi_{ii}(\sigma)$ . . . $\phi_{ii}(i\sigma)$, . . . and $\phi_{ii}(m\sigma)$ of the accumulators $AS_1$, $AS_2$, . . . $AS_i$ . . . and $AS_m$ temporarily stored in the buffer memory ABM.

$$h(j\sigma)=\frac{\begin{vmatrix} \phi_{ii}(0), \phi_{ii}(\sigma) \text{-----} \phi_{io}(0) \text{---} \phi_{ii}(m\sigma) \\ \phi_{ii}(\sigma), \phi_{ii}\text{-----} \phi_{io}(\sigma) \text{---} \phi_{ii}[(m-1)\sigma] \\ \cdot \\ \phi_{ii}(m\sigma), \phi_{ii}[(m-1)\sigma] \text{--} \phi_{i}(m\sigma) \text{--} \phi_{ii}(0) \end{vmatrix}}{\begin{vmatrix} \phi_{ii}(0), \phi_{ii}(\sigma) \text{-----} \phi_{ii}(i\sigma) \text{--} \phi_{ii}(m\sigma) \\ \phi_{ii}(\sigma), \phi_{ii}\text{-----} \phi_{ii}[(j-1)\sigma] \text{-} \phi_{ii}[(m-1)\sigma] \\ \\ \phi_{ii}(m\sigma), \phi_{ii}[(m-1)\sigma] \text{--} \phi_{ii}[(m-j)\sigma] \text{-} \phi_{ii}(0) \end{vmatrix}} \quad (12)$$

Where $j$ is an integer equal from zero to $m$.

The circuit MTX calculates the impulse responses $h(0)$, $h(\sigma)$, . . . $h(i\sigma)$, . . . and $h(m\sigma)$, which are derived therefrom as its outputs. A reference character IBM indicates a buffer memory for temporarily storing impulse response $h(0)$, $h(\sigma)$, . . . $h(i\sigma)$, . . . and $h(m\sigma)$ calculated in the circuit MTX. A reference characters $IM_1$, $IM_2$, . . . $IM_i$, . . . $IM_m$ indicate multipliers for obtaining the convolution integral; ADD designates an adder circuit; and 9 identifies a subtractor. In this illustrated circuit, a four-wire to two-wire coupling circuit including a hybrid is omitted for simple illustration.

The operation of this circuit will be hereinafter described. A receiving voice current, which is applied to the receiving signal input terminal 3, is transmitted to a near-end party through the receiving signal output terminal 4 and, at the same time, it is reflected and appears as an echo at the sending input terminal 1. On the other hand, a part of the receiving voice current $f_i(t)$ is converted by the analogue-digital signal converter A/D-1 into a digital signal and then divided into two parts, one of which is applied as a common input to the multipliers $AM_1$, $AM_2$, . . . $AM_i$ . . . and $AM_m$, and the other of which is applied to the delay circuits 7 having the successive delay times $\sigma$. The outputs derived from the delay circuits 7 ($DL_2$, $DL_3$, . . . $DL_i$, . . . $DL_m$) are further divided respectively into two parts, ones of which are applied as respective inputs of the multipliers $AM_1$, $AM_2$, . . . $AM_i$, . . . and $AM_m$, and the others of which are applied as respective inputs of the multipliers $CM_1$, $CM_2$, . . . $CM_i$ . . . and $CM_m$. In the multipliers $AM_1$, $AM_2$, . . . $AM_i$ . . . and $AM_m$, the receiving voice current $f_i(t)$ is multiplied by the receiving voice current or the same successively delayed by the time $\sigma$, and the multiplied outputs are temporarily stored in the accumulators $AS_1$, $AS_2$, . . . $AS_i$, . . . and $AS_m$ for a certain period of time, for example, for a time T, thereafter being sampled to provide autocorrelation outputs $\phi_{ii}(0)$, $\phi_{ii}(\sigma)$, . . . $\phi_{ii}(i\sigma)$ . . and $\phi_{ii}(m\sigma)$, which are temporarily stored in the buffer memory ABM. At this time, the reflected-and-returned echo $e(t)$ and an external disturbance signal $d(t)$ are converted into a digital signal by the analogue-digital signal converter A/D-2 and then applied to the multipliers $CM_1$, $CM_2$, . . . $CM_i$ . . . and $CM_m$. Since the multipliers $CM_1$, $CM_2$, . . . $CM_i$, . . . and $CM_m$ are supplied with the receiving voice current $f_i(t)$ and the currents successively delayed by the time $\sigma$, the multipliers $CM_1$, $CM_2$, . . . $CM_i$, . . . and $CM_m$ immediately achieve the multiplication of the receiving voice current and the currents delayed by the time $\sigma$ by the signal composed of the echo $e(t)$ and the external disturbance signal $d(t)$. The outputs derived from the multipliers $CM_1$, $CM_2$, . . . $CM_i$, . . . $CM_m$ are stored in the subsequent accumulators $CS_1$, $CS_2$, . . . $CS_i$, . . . and $CS_m$ for a certain period of time, for example, the time T, and then sampled to provide the cross-correlation outputs $\phi_{io}(0)$, $\phi_{io}(\sigma)$, . . . $\phi_{io}(i\sigma)$ . . . and $\phi_{io}(m\sigma)$, which are temporarily stored in the buffer memory CBM. The time T is required to be long enough to neglect the influence of the external disturbance. In the determinant solving operation circuit MTX, the calculation of the equation (12) is achieved by the use of cross-correlation outputs $\phi_{io}(0)$, $\phi_{io}(\sigma)$, . . . $\phi_{io}(i\sigma)$, . . . and $\phi_{io}(m\sigma)$ and autocorrelation outputs $\phi_{ii}(0)$, $\phi_{ii}(\sigma)$, . . . $\phi_{ii}(i\sigma)$, . . . and $\phi_{ii}(m\sigma)$ temporarily stored in the buffer memories CBM and ABM, respectively, thereby calculating the impulse responses $h(0)$, $h(\sigma)$, . . . $h(i\sigma)$, . . . and $h(m\sigma)$. At the time of completion of the calculation, the impulse responses $h(0)$, $h(\sigma)$, . . . $h(i\sigma)$, . . . and $h(m\sigma)$ thus obtained are temporarily stored in the buffer memory IBM. The multiplication of the impulse responses temporarily stored in the buffer memory IBM by the receiving voice current $f_i(t)$ is carried out in the multipliers $IM_1$, $IM_2$, . . . $IM_i$, . . . and $IM_m$, and the multiplied outputs are added together by the adder circuit ADD to provide the added output, which is then converted by the digital-analogue converter D/A into an analogue signal. This analogue signal $e(t)$ is a pseudo-echo. The analogue signal $e(t)$ is applied to the subtractor 9 to cancel the actual echo.

At the instant when the impulse responses are once transferred into the buffer memory IBM, the aforesaid correlations are obtained again and new correlation outputs $\phi_{io}(0)$, $\phi_{io}(\sigma)$, . . . $\phi_{io}(i\sigma)$, . . . $\phi_{io}(m\sigma)$ and $\phi_{ii}(0)$, $\phi_{ii}(\sigma)$, . . . $\phi_{ii}(i\sigma)$, . . . and $\phi_{ii}(m\sigma)$ are applied to the buffer memories CBM and ABM, respectively. Then the impulse responses are calculated by the circuit MTX and, at the instant when the impulse responses are calculated, the previous impulse responses stored in the buffer memory IBM are replaced by the new impulse responses. Thus, echoes can be cancelled while periodically obtaining new impulse responses.

Further, if another auxiliary buffer memory is added to each of the buffer memories CBM and ABM, it is possible to obtain subsequent new correlations during the time, in which the impulse responses are calculated in the circuit MTX. This speeds up the rewriting of the impulse responses and enables following rapid fluctuations in the echo return path.

As has been described in the foregoing, establishment of the impulse responses, composition of the pseudo-echo and its cancellation can be achieved independently in the device of this invention, so that there is no unstability in the echo calculation which is prculiar to "an addaptive echo canceller" utilizing residual echos. Since no feedback loop is used in the device of this invention, the convergence time is zero. Further, since the impulse responses are substantially, continuously rewritten, it is possible to sufficiently follow up the change in the echo return path. Moreover, since the autocorrelation circuit is used, impulse responses can be established even by noises other than the voice applied to the receiving side so that the device of this invention is effective in practice. In addition, the circuit for establishing the impulse response can be employed in a multi-channel and in a timedivisional manner, so that in the case of considering multiplication, the echo canceller is required to have the function of composition of the pseudo-echo and echo-cancellation only and thus becomes economical.

What I claim is:

1. An echo canceller for cancelling echoes reflected from the receiving path of a long-distance telephone circuit to the sending path through a four-wire to two-wire coupling circuit connected between said receiving and sending paths, comprising:

cross-correlation means connected to said receiving path and said sending path for establishing the crosscorrelation between the instantaneous level of a received signal in said receiving path and the instantaneous level of a transmitted signal in said sending path and to provide a cross-correlation output signal representative of the cross-correlation;

autocorrelation means connected to said receiving path for establishing the autocorrelation of the instantaneous level of said received signal and to provide an autocorrelation output signal representative of said autocorrelation;

calculation means connected to said crosscorrelation means and said autocorrelation means and receptive of said cross-correlation and autocorrelation signals for calculating the impulse response of an echo return path from the receiving path to the sending path through said four-wire to two-wire coupling circuit by solving for said impulse response the equation defining said cross-correlation as equal to the convolution of said impulse response with said autocorrelation;

memory means connected to said calculation means for temporarily storing the calculated impulse response;

integration means connected to said memory means and said receiving path for evaluating the convolution integral of the temporarily stored impulse response with the received signal to provide a convolution integral output signal representative of the echo component of the transmitted signal; and subtraction means connected to said sending path and said integration means for subtracting said convolution integral output signal from said transmitted signal.

2. An echo canceller for cancelling echoes reflected from the receiving path of a long-distance telephone circuit to the sending path through a four-wire to two-wire coupling circuit connected between said receiving and sending paths, comprising:

cross-correlation means connected to said receiving path and said sending path for successively establishing in regular intervals the cross-correlation between the instantaneous level of a received signal in said receiving path and the instantaneous level of a transmitted signal in said sending path to provide successive cross-correlation output signals representative of the cross-correlation;

autocorrelation means connected to said receiving path for successively establishing in said regular intervals the autocorrelation of the instantaneous level of the received signal to provide successive autocorrelation output signals representative of said autocorrelation;

calculation means connected to said crosscorrelation means and said autocorrelation means and receptive of said cross-correlation and autocorrelation signals for calculating in regular intervals the impulse response of an echo return path from the receiving path to the sending path through said four-wire to two-wire coupling circuit by solving for said impulse response the equation defining said cross-correlation as equal to the convolution of said impulse response with said autocorrelation;

memory means connected to said calculation means for temporarily storing the calculated impulse response;

integration means connected to said memory means and said receiving path for evaluating the convolution integral of the temporarily stored impulse response with the received signal to provide a convolution integral output signal representative of the echo component of the transmittal signal; and subtraction means connected to said sending path and said integration means for subtracting said convolution integral output signal from said transmitted signal.

3. An echo canceller according to claim 2, in which siad cross-correlation means comprises a first analogue-digital converter connected to said receiving path, a second analogue-digital converter connected to said sending path, a plurality of delay circuits in cascade and connected to said first analogue-digital converter to successively delay the digital output of the first analogue-digital converter by successive times to provide successively delayed digital outputs, a plurality of first multipliers connected to said second analogue-digital converter and the successively delayed digital outputs of said delay circuits respectively, and a plurality of first accumulators each connected to the output of a respective one of said first multipliers to provide said cross-correlation outputs.

4. An echo canceller according to claim 2, in which said auto-correlation means comprises a first analogue-digital converter connected to said receiving path, a plurality of delay circuits in cascade and connected to said first analogue-digital converter to successively delay the digital output of the first analogue-digital converter by successive times to provide successively delayed digital outputs, a plurality of second multipliers connected to said first analogue-digital converter and the successively delayed digital outputs of said delay circuits respectively, and a plurality of second accumulators each connected to the output of a respective one of said second multipliers to provide said autocorrelation outputs.

5. An echo canceller according to claim 2, in which said integration means comprises a plurality of third multipliers connected to said memory means and said successively delayed digital outputs, an adder circuit connected to the output of each of said third multipliers, and a digital-analogue converter connected to the output of said adder circuit to produce said convolution integral output.

* * * * *